Feb. 24, 1959    C. D. MORRILL ET AL    2,875,389
CURVE FOLLOWER
Filed Dec. 13, 1955    4 Sheets-Sheet 1

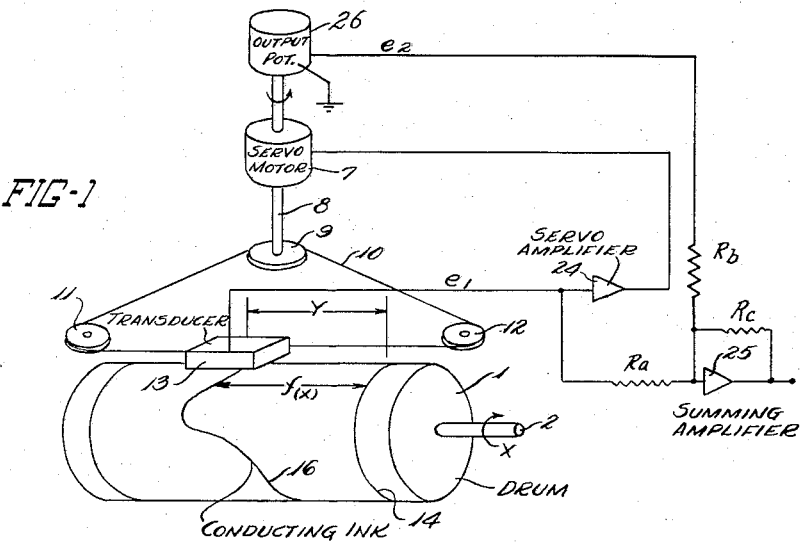

FIG-1

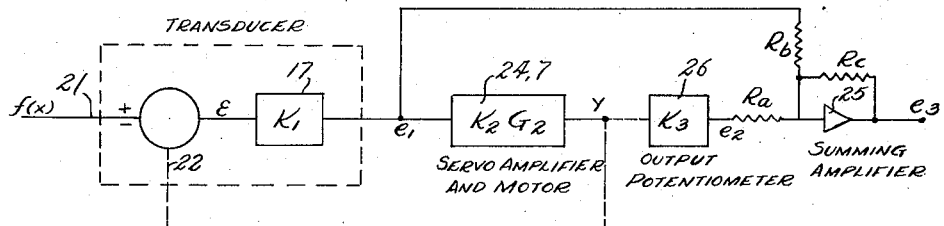

FIG-2

$f(x)$ = FUNCTION TO BE GENERATED — INCHES
$y$ = DISPLACEMENT OF TRANSDUCER - INCHES
$x$ = DISPLACEMENT OF DRUM SURFACE - INCHES
$e_1$ = OUTPUT OF TRANSDUCER - VOLTS
$e_2$ = OUTPUT OF POTENTIOMETER - VOLTS
$e_3$ = OUTPUT OF SUMMING AMPLIFIER - VOLTS
$\varepsilon$ = TRACKING ERROR - INCHES
$K_1$ = TRANSDUCER CONSTANT - VOLTS / INCH
$K_2$ = SERVO CONSTANT, DEGREES / VOLT
$G_2$ = COMPLEX PORTION OF SERVO GAIN
$K_3$ = POTENTIOMETER CONSTANT VOLTS / DEGREE
—— ELECTRICAL CONNECTION
--- MECHANICAL LINKAGE INVENTORS
CHARLES D. MORRILL
HARRY L. HOSTERMAN, Jr
BY PHILLIP R. VANCE A.H. Oldham
ATTY.

Feb. 24, 1959　　　C. D. MORRILL ET AL　　　2,875,389
CURVE FOLLOWER
Filed Dec. 13, 1955　　　　　　　　　　　　　　　　4 Sheets-Sheet 2

INVENTORS
CHARLES D. MORRILL
HARRY L. HOSTERMAN, Jr.
BY PHILLIP R. VANCE

W. H. Oldham ATTY.

Feb. 24, 1959  C. D. MORRILL ET AL  2,875,389
CURVE FOLLOWER
Filed Dec. 13, 1955  4 Sheets-Sheet 3

INVENTORS
CHARLES D. MORRILL
HARRY L. HOSTERMAN, Jr.
BY PHILLIP R. VANCE

ATTY-

Feb. 24, 1959

C. D. MORRILL ET AL 2,875,389

CURVE FOLLOWER

Filed Dec. 13, 1955

INVENTORS
CHARLES D. MORRILL
HARRY L. HOSTERMAN Jr.
BY PHILLIP R. VANCE

United States Patent Office 2,875,389
Patented Feb. 24, 1959

2,875,389

CURVE FOLLOWER

Charles D. Morrill, Cuyahoga Falls, and Harry L. Hosterman, Jr., Atwater, Ohio, and Philip R. Vance, Concord, Mass., assignors to Goodyear Aircraft Corporation, Akron, Ohio, a corporation of Delaware Application December 13, 1955, Serial No. 552,785

8 Claims. (Cl. 318—31)

This invention relates to an instrument servo mechanism that can be used either as an X—Y recorder or as a curve follower type of function generator. The invention is particularly useful as either an input or output instrument for use with an analog computor. When used as an input unit, the instrument is intended to supplement other nonlinear analog computing equipment providing a versatile low frequency function generator. When used as an output unit, the instrument is essentially an X—Y recorder and provides a convenient means of plotting one voltage against another.

While curve followers have been heretofore proposed, some of these have required use of a low resistance ink or paint for drawing the curve. Other devices have required that a conductive metal wire be cemented to the curve as an arm of an output generator or to provide a potentiometer type transducer.

It is an object of the present invention to overcome the foregoing and other objections to curve followers heretofore proposed.

It is an object of the present invention to provide a curve follower capable of following a pencilled curve.

Another object is to utilize the transducer error voltage to compensate for errors in transducer position.

These and other objects will appear from the following description and the accompanying drawings.

Of the drawings.

Fig. 1 is a simplified schematic drawing of the curve follower system.

Fig. 2 is a block diagram of the curve follower system.

Fig. 8 is an amplitude spectrum chart of the rectified sin wave.

Figure 3:
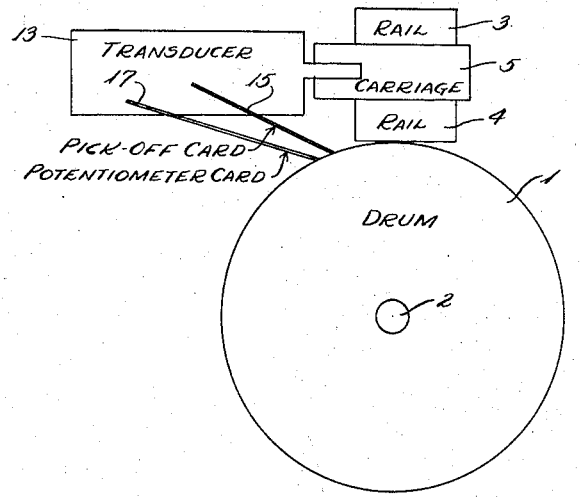
Fig. 3 is a sectional side view of the transducer.

Referring to the drawings, and first to Fig. 1 thereof, the numeral 1 designates a rotatable drum mounted on an axle 2 for rotation about its axis. The drum may be given a movement of rotation by a servo-mechanism (not shown) but including an electric motor and suitable driving gear for rotating the drum. A pair of guide rails 3, 4, see Fig. 3, are supported near the face of the drum and parallel to its axis. A carriage 5 is mounted on the rails for movement therealong. The carriage 5 may be moved along rails 3 and 4 axially of the drum by a suitable servomotor 7 on the shaft 8 of which is a pulley 9 to which ends of a wire 10 or other transmission means may be secured. The wire is trained about guide pulleys 11, 12 and a reach thereof extends parallel to the drum axis and is secured to the carriage 5.

Operation as a function generator is achieved by attaching a transducer 13 to the carriage 5. The function to be generated $f(x)$, is plotted with conductive ink or a soft lead pencil to provide a conductive trace on a sheet 14 of paper and the paper is mounted about the drum 1.

Figure 4:
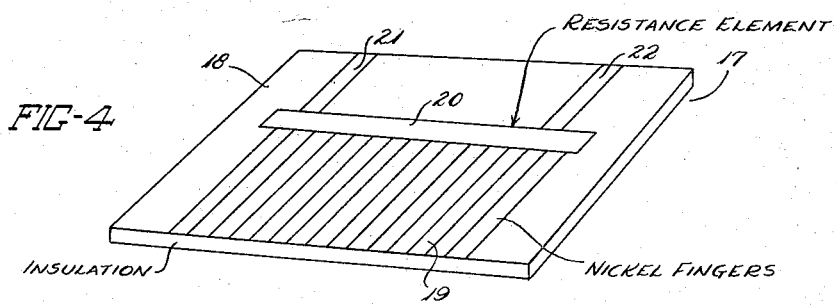
Fig. 4 is a bottom view of the potentiometer card.

The transducer 13 includes a potentiometer card 17 which applies a voltage to the conductive trace 16 proportional to the relative position of the center line of the card and the conductive trace in a manner to be described. The transducer also includes a pick-off card 15 which picks up the voltages applied to the line and applies this error voltage to the servo amplifier. The displacement error, that is the distance between the center line of the transducer and the line at the point of contact between the potentiomeer card and the line, is represented by a voltage on the pick-off card. As described, this error voltage is used in a servo loop to reduce said error to zero. It is also summed in the summing amplifier 25 with the output of the output potentiometer 26 to produce a voltage which is equal to carriage position Y plus carriage error $e_1$ which is a voltage proportional to the displacement of the conductive line, which voltage is designated $f(x)$. An output potentiometer 26 is coupled to the carriage and provides a voltage proportional to the Y displacement of the carriage. The potentiometer 17 includes a card 18 of insulating material such as sheet plastic on which are secured a multiplicity of elongate conductive fingers 19, there being, for example, one hundred of these fingers of nickel or other conductive relatively non-tarnishing metal per inch of card width each having an end contacting the drum face in the path of the conductive trace. A resistance element 20 in the form of a strip extends crosswise along the card in contact with all the conductive fingers. A pair of leads 21, 22 are connected to opposite ends of resistance element 20 while the conductive trace 16 provides the movable contact of the potentiometer. The entire potentiometer may be a printed circuit. Equal voltages of different polarity are supplied to opposite ends of the resistance element 20 through leads 21, 22 from any desired source. The error voltage, applied to the conducting curve by the potentiometer card, is proportional to the axial displacement between the curve and the center of the card. The pick-off card 15 is identical to the potentiometer card 17 except that the resistance element corresponding to element 20 is a short circuit. Leads corresponding to 21 and 22 of Fig. 4 become the transducer output voltage which is applied both to the servo amplifier 24 and the summing amplifier 25.

A block diagram of the curve following system is shown in Fig. 2. The transducer 13, servomotor 7 and servo amplifier 24 and summing amplifier 25 comprise a positional servo mechanism, which tends to position the transducer so that Y is equal to $f(X)$:

$$\frac{Y}{f(X)}(S) = \frac{K_1 K_2 G_2(S)}{1 + K_1 K_2 G_2(S)} \quad (1)$$

The output of the summing amplifier 25 is proportional to the sum of the transducer and output potentiometer voltages $$e_o = -\left(\frac{R_c}{R_a}\right)e_2 - \left(\frac{R_c}{R_b}\right)e_1 \text{ volts} \quad (2)$$

where $$e_1 = K_1[f(X) - Y]v \quad (3)$$

and $$e_2 = K_3 Y v \quad (4)$$

Equations 2, 3 and 4 are solved for $e_o$ in terms of Y and $f(X)$:

$$e_o = -\left(\frac{R_c}{R_a}\right)K_3 Y - \left(\frac{R_c}{R_b}\right)K_1(f(X)) + \left(\frac{R_c}{R_b}\right)K_1 Y \text{ volts} \quad (5)$$

The parameters $R_a$, $R_b$, $R_c$, and $K_1$ and $K_3$ are adjusted so that the first and last terms in Equation 5 cancel each other, making the output of the summing amplifier proportional to $f(x)$, within the linearity limitations of the transducer, regardless of the tracking error. Therefore, the only limitation that needs to be placed upon $f(X)$ is that it must not require a tracking error that exceeds the range of the transducer.

Figure 5:
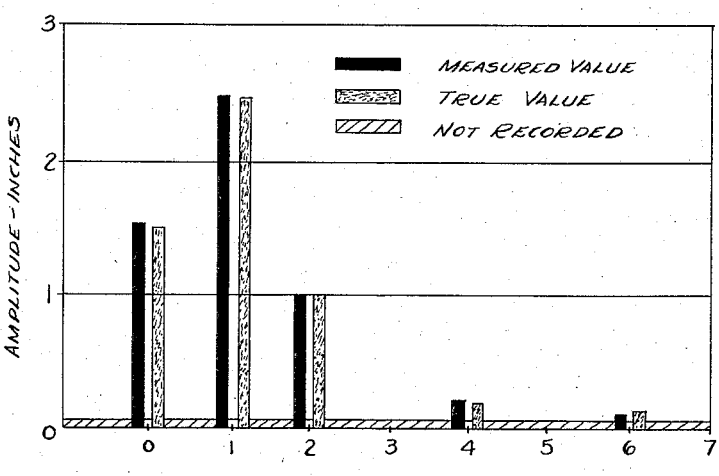
Fig. 5 is a step-function response diagram of the curve follower.
Figure 5:
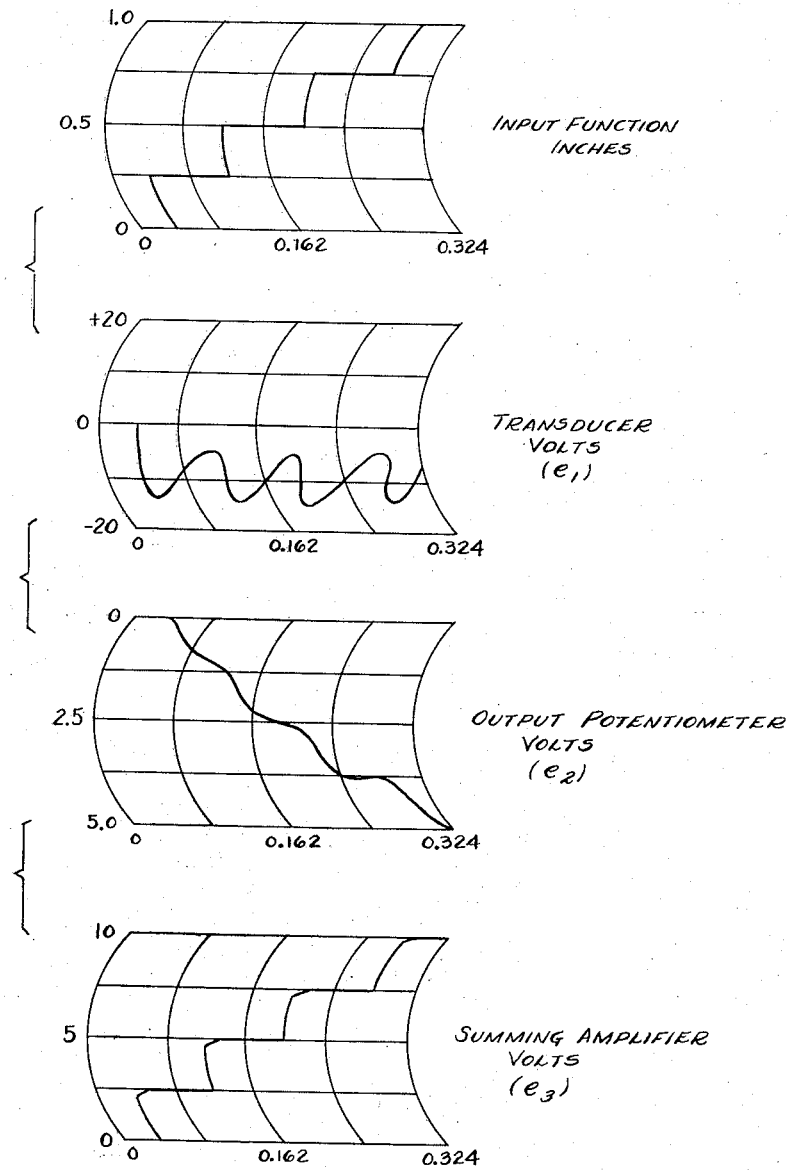

Adding the transducer and output potentiometer voltages minimizes errors in following the curve due to dynamic limitations, friction, or jitter of the Y servo mechanism. The output of the summing amplifier is proportional to $f(X)$. This minimizing of errors as shown mathematically in Equations 2 through 5 was further demonstrated in the laboratory by plotting a series of one-fourth inch step functions and mounting the graph on the drum 1. The output voltages of the transducer output potentiometer, and summing amplifier were recorded as the drum was driven at a constant velocity. From the recorded voltages, see Fig. 5, it is apparent that voltage components corresponding to rapid fluctuations in $f(X)$ are supplied to the summing amplifier by the transducer while more slowly varying components of $f(X)$ are supplied by the output potentiometer.

The operation of the apparatus, Figs. 1 to 4, when used as a curve follower or function generator are as follows:

The drum 1 is rotated, either at a uniform velocity or proportionally to an input voltage, and carries a sheet 14 of paper on which a conductive trace 16 has been drawn. The transducer 13 is stationary unless moved by servo motor 7. Constant positive and negative voltages are applied to terminals 21, 22 respectively of the potentiometer card 17. As the drum rotates, the trace will contact some finger of the potentiometer card depending upon the relative axial position of the contacting point of the trace and will charge the trace correspondingly. This voltage will be conducted to the pick-off card 15 which contacts the trace close to the contact of the potentiometer with the trace. The error voltage from the pick off card of the transducer is transmitted to servo amplifier 24 and summing amplifier 25. Servo amplifier 24 controls servo motor 7 which applies corrective movements to the transducer according to the amount of error transmitted. Such corrective movements change the setting of output potentiometer 26 which supplies a voltage $e_2$ to the summing amplifier which is there combined with the voltage $e_1$, the error voltage. The summing amplifier supplies at its output terminal, the desired function $e_3$.

In a typical application where $f(x)$ is in the 1st quadrant, the output potentiometer is supplied at one end terminal with a constant negative voltage from a suitable source and at the other end terminal is connected to ground and voltage $e_2$ is taken off its movable voltage divider contact.

A representative application of the input-output unit described is found in the determination of the amplitude spectrum of a periodic function. If $f(t)$ is a periodic function whose period is T, and if the Fourier series expansion exists, then $f(t)$ can be expressed as:

$$f(t) = \frac{a_o}{2} + \sum_{n=1}^{\infty}\left[ a_n \cos\left(\frac{2\omega n_t}{T}\right) \right. \quad (6)$$

$$\left. + \sum_{n=1}^{\infty} b_n \sin\left(\frac{2\omega n_t}{T}\right) \right] \quad (7)$$

where $$\frac{a_o}{2} = \frac{1}{T}\int_0^T f(t)dt \quad (8)$$

$$a_n = \frac{2}{T}\int_0^T f(t) \cos\left(\frac{2\pi n t}{T}\right)dt \quad (9)$$

and $$b_n = \frac{2}{T}\int_0^T f(t) \sin\left(\frac{2\pi n t}{T}\right)dt$$

The amplitude coefficients, $a_0/2$, $a_n$, and $b_n$, can be determined from an analog-computer solution of (7), (8), and (9), respectively.

Figure 6:
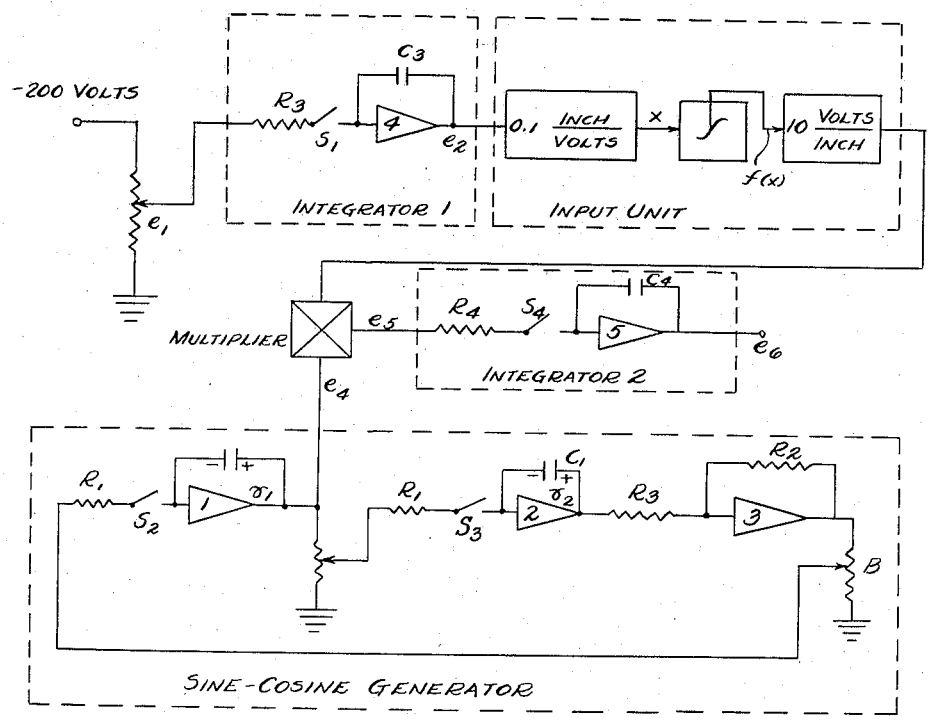
Fig. 6 is a diagram of a computor set-up for Fourier series expansion.

One computer method of solution for the amplitude coefficients is shown in Fig. 6. An input-output unit is used to generate a voltage proportional to $f(t)$, and a sin-cos generator furnishes a voltage proportional to either $\cos[(2\pi n/T)t]$ or $\sin[(2\pi n/T)t]$. An electronic multiplier provides a voltage proportional to the product $f(t)\cos[(2\pi n/T)t]$ or $f(t)\sin[(2\pi n/T)t]$, and an integrator, operating between the limits $t=0$ and $t=T$, completes the required operation. The integrator output corresponds to either $a_n$ or $b_n$, depending upon whether the sin-cos generator is adjusted to generate a cos function or a sin function. The constant term $a_0/2$ is determined by feeding the voltage from the input-output unit directly to the integrator, and integrating from $t=0$ to $t=T$.

The components shown in Fig. 6, other than the input-output unit, are all standard units of a general-purpose electronic differential analyzer, and interconnections between units are made through a removable problem board. The switches, $S_1$, $S_2$, $S_3$, and $S_4$, make it possible to apply initial-condition voltages to the amplifier feedback capacitors, and to hold these voltages until the problem is started. The switches operate simultaneously, providing a convenient means of starting and stopping the problem. Problem time, $t$, is measured from the instant of closure of the switches, and integration from $t=0$ to $t=T$ is accomplished by holding the switches closed for T secs.

Figure 7:
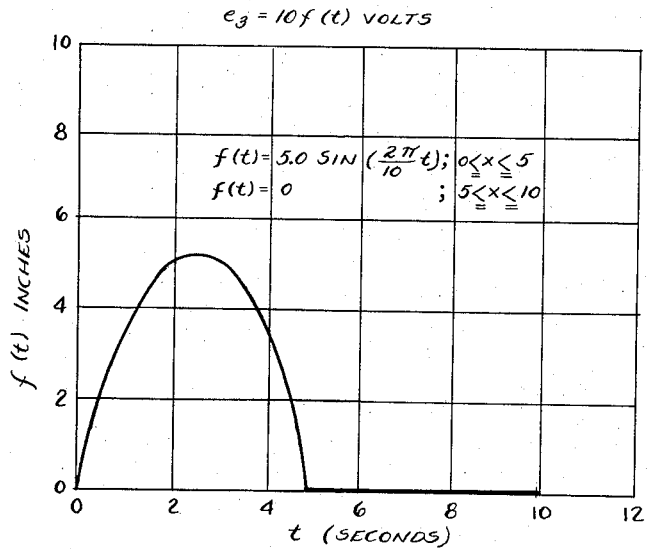
Fig. 7 is a drawing showing the rectified sin wave.

In this example, $f(t)$ is a half wave rectified sin wave, one period of which is shown in Fig. 7. The input-output unit uses the curve $f(t)$, plotted with a scale factor of 1.0 inch per second for the abscissa and 0.10 inch per v. for the ordinate, to generate:

$$e_3 = 10 f(t) \text{ volts} \quad (10)$$

Integrator 1 provides the proper drum-positioning voltage, $e_2$, to drive the drum at a rate of 1.0 inch per second. The voltage $e_4$ is either a sin or a cos function, depending upon the initial-condition voltages $\gamma_1$ and $\gamma_2$ applied to the feedback capacitors of amplifiers 1 and 2, respectively. Specifically, $$e_4 = 100 \cos \omega t \text{ volts } (\gamma_1 = +100 \text{ volts}; \gamma_2 = 0) \quad (11)$$

and $$e_4 = x100 \sin \omega t \text{ volts } (\gamma_1 = 0; \gamma_2 = +100 \text{ volts}) \quad (12)$$

Frequency, $\omega$, is determined by the parameters $\beta$, R, and C, which are adjusted so that $\omega$ corresponds to the appropriate harmonic of $f(t)$:

$$\omega = \frac{\beta}{R_1 C_1} = \frac{2\pi n}{10} \text{ radians per sec } (n=1, 2, 3, \ldots) \quad (13)$$

Integrator 2 is driven by the output voltage of the multiplier $e_5$, which is proportional to the product of $e_3$ and $e_4$. The values of the input resistance $R_4$ and feedback capacitance $C_4$ are chosen so that $$e_{6a} = -10 \int_0^{10} f(t) \cos\left(\frac{2\pi n t}{10}\right) dt \text{ volts}$$
$$(\gamma_1 = +100 \text{ volts}; \gamma_2 = 0) \quad (14)$$

and $$e_{6b} = -10 \int_0^{10} f(t) \sin\left(\frac{2\pi n t}{10}\right) dt \text{ volts}$$
$$(\gamma_1 = 0; \gamma_2 = +100 \text{ volts}) \quad (15)$$

In this particular example, the function $f(t)$ is zero for all values of $t$ between 5 and 10 sec., and the switches can be opened at any time during this interval without affecting the voltages $e_{6a}$ and $e_{6b}$.

A comparison of (14) and (15) with (8) and (9) shows that the amplitude coefficients, $a_n$ and $b_n$, are proportional to the output of integrator 2:

$$a_n = \frac{-e_{0a}}{50} \text{ inches} \tag{16}$$

and $$b_n = \frac{-e_{0b}}{50} \text{ inches} \tag{17}$$

If the voltage $e_3$ is applied directly to the input of integrator 2, the output is given by $$e_{0o} = -10 \int_0^{10} f(t)dt \text{ volts} \tag{18}$$

Comparison of (18) and (7) shows that $$\frac{a_o}{2} = \frac{-e_{0o}}{100} \text{ inches} \tag{19}$$

The computer solution for the amplitude spectrum, of the function described in Fig. 7, is plotted in Fig. 8. Harmonic amplitudes smaller than 0.05 inch were neglected, as indicated by the cross-hatched portion of the graph. The maximum difference between the true and measured amplitudes of any of the harmonics is less than 0.05 inch, or less than 1 percent of the amplitude of the rectified sin wave.

Other applications are found in computer studies of guided missiles or aircraft. The instrument can be used as a recorder to provide a convenient means of plotting missile trajectories in two coordinates. As a function generator it can be used in aerodynamics studies to generate the conversion factor as a function of altitude, between Mach number and velocity. In computer studies of autopilots, the device can be used to generate forcing functions representing realistic stick and pedal motions. Another application is found in computer studies of internal combustion engines in which the device can be used to generate the lift versus stroke characteristics of cams. This list of applications is by no means a comprehensive one, and is given only as an indication of the utility of the instrument.

From the foregoing description, it will be apparent that the instrument of this invention may be used either as an input or output member of an analog computer and may be used as a function generator, curve follower or input unit, or as a XY plotter or output member.

The servo mechanism for providing rotative movement of the drum may be an electric motor or other well known driving device.

While a certain representative embodiment and details have been shown for the purpose of illustrating the invention, it will be apparent to those skilled in the art that various changes and modifications may be made therein without departing from the spirit or scope of the invention.

What is claimed is:

1. A curve follower comprising a translational or rotational member supporting upon its surface a graph sheet having a conductive trace thereon, a transducer supported for movement along the surface of the graph sheet, said transducer being adapted to maintain contact with said conductive trace, a servo mechanism for providing movement of said member, a second servo mechanism for moving said transducer axially of said member, said transducer including a potentiometer having a continuous resistance element for contacting the conductive trace and a constant voltage source applied thereacross for applying an error voltage to the conductive trace which is proportional to the axial displacement between the transducer and the trace, and a conductive pick-up card carried by the same transducer for maintaining contact with the trace and transmitting the error voltage to said second servo mechanism to correct displacement of said transducer.

2. A curve follower comprising a movable member for supporting upon its surface a graph sheet having a conductive trace thereon, a transducer supported for movement along the face of the graph sheet, said transducer being adapted to maintain contact with said conductive trace, a servo mechanism for providing a rotative movement of said member, a second servo mechanism for moving said transducer axially of said member, said transducer including a potentiometer having a continuous resistance element for contacting the conductive trace and a constant voltage source applied thereacross for applying an error voltage to the conductive trace which is proportional to the axial displacement between the transducer and the trace, and a conductive pick-up card carried by the same transducer for maintaining contact with the trace and transmitting the error voltage to said second servo mechanism to correct displacement of said transducer, said potentiometer comprising a multiplicity of flexible conductive fingers for contact with said trace, all of said fingers contacting a strip of high resistance material at positions therealong, and means for supplying a positive voltage at one end of said strip and a negative voltage at the opposite end of the strip, the algebraic sum of the applied voltages being zero.

3. A curve follower for use as an input member of an analog computer, said curve follower comprising a rotatable drum for supporting upon its surface a graph sheet having a conductive trace thereon, a transducer supported for movement along the face of the drum, said transducer being adapted to maintain contact with said conductive trace, a servo mechanism for providing a rotative movement of said drum, a second servo mechanism for moving said transducer axially of said drum, said transducer including a potentiometer having a continuous resistance element for contacting the conductive trace and a constant voltage source applied thereacross for applying an error voltage to the conductive trace which is proportional to the axial displacement between the transducer and the trace, and a conductive pick-up card carried by the same transducer for maintaining contact with the trace and transmitting the error voltage to said second servo mechanism to correct displacement of said transducer, said potentiometer comprising a card having parallel conductive elements thereon terminating at an edge of the card to contact the trace and a strip of high resistance material bridging and contacting all the conductive elements, and means for supplying voltages of opposite polarity to opposite ends of said strip.

4. A curve follower for use as an input member of an analog computer, said curve follower comprising a rotatable drum for supporting upon its surface a graph sheet having a conductive trace thereon, a transducer supported for movement along the face of the drum, said transducer being adapted to maintain contact with said conductive trace, a servo mechanism for providing a rotative movement of said drum, a second servo mechanism for moving said transducer axially of said drum, said transducer including a potentiometer having a continuous resistance element for contacting the conductive trace and a constant voltage source applied thereacross for applying an error voltage to the conductive trace which is proportional to the axial displacement between the transducer and the trace, and a conductive pick-up card carried by the same transducer for maintaining contact with the trace and transmitting the error voltage to said second servo mechanism to correct displacement of said transducer, said pick-up card comprising a multiplicity of conductive fingers for contact with said trace, all of said fingers contacting a strip of conductive metal for transmitting an error voltage therefrom.

5. A curve follower as defined by claim 1 comprising a summing amplifier for summing the output of the transducer and the output potentiometer.

6. Curve-following apparatus of the type in which a movable conductive line is employed to produce a variable voltage by contact with a potentiometer resistance element mounted for movement transverse of the path of travel of the line, means providing a constant voltage across said resistance, said apparatus comprising means for maintaining contact of the potentiometer resistance with the line, a carriage for supporting said resistance element, a conductive pick-up card mounted on said carriage in close proximity to said resistance element and means for maintaining said pick-up card in contact with said conductive line to pick up an error positional correction voltage therefrom.

7. Curve following apparatus as defined by claim 6 in which the means for maintaining contact of the potentiometer resistance with the line is a flexible card, and conductive elements extending along said card in closely spaced apart relation from resistance member to a margin of said card for contacting said line at intervals of approximately 1/100 inch.

8. Curve following apparatus as defined by claim 6 in which said pick-up card is a flexible card having conductive elements thereon extending to a margin of said card at intervals of approximately 1/100 inch apart for contacting said line and a low resistance shorting bar for connecting all said elements.

References Cited in the file of this patent
UNITED STATES PATENTS

| | | |
|---|---|---|
| 2,354,391 | McCourt | July 25, 1944 |
| 2,594,716 | Bailey | Apr. 29, 1952 |
| 2,679,620 | Berry | May 25, 1954 |